J. M. CARSON.
AUTOMATIC SIGNAL.
APPLICATION FILED JUNE 13, 1913.
1,231,847.
Patented July 3, 1917.
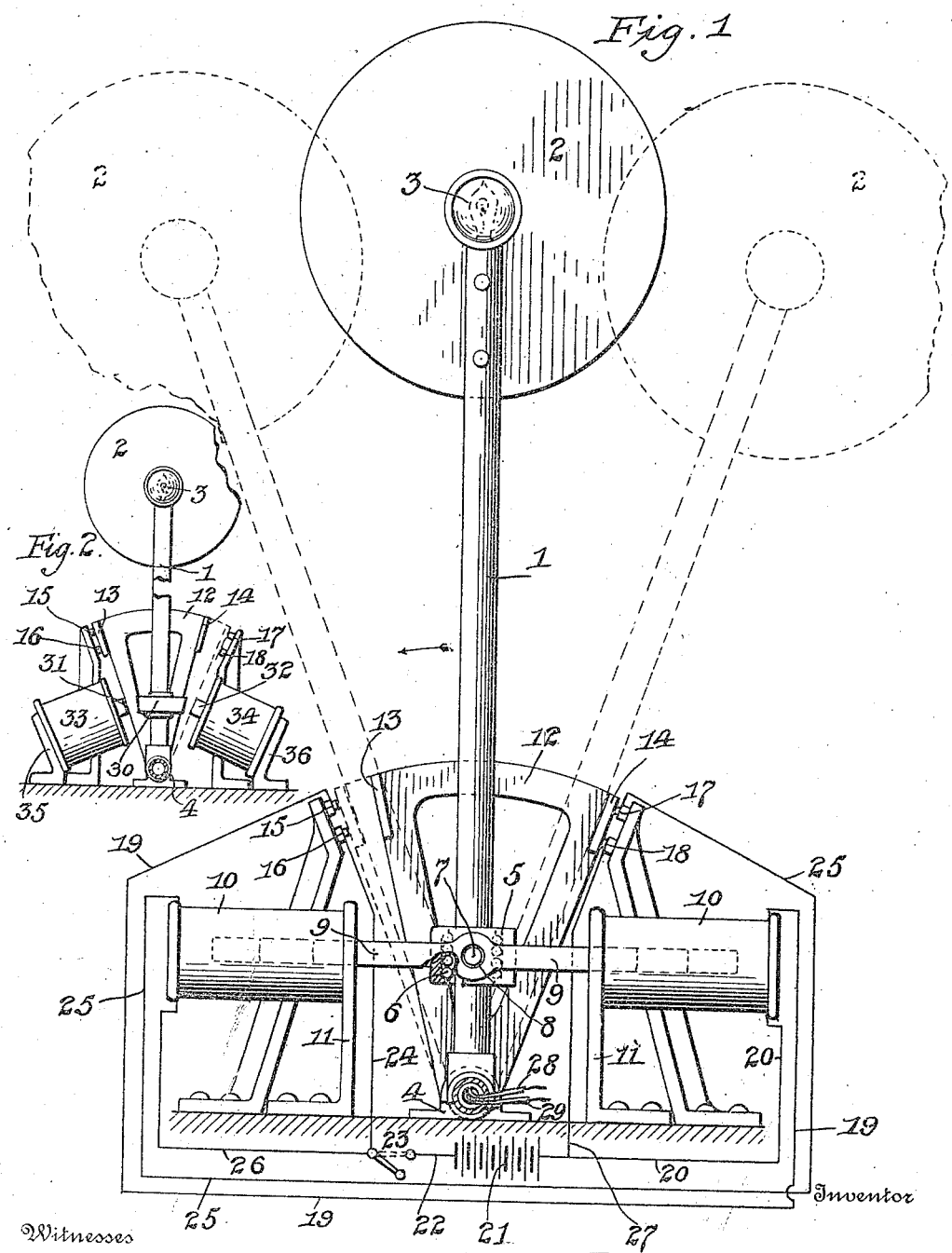

UNITED STATES PATENT OFFICE.

JOHN M. CARSON, OF LOS ANGELES, CALIFORNIA.

AUTOMATIC SIGNAL.

1,231,847.  Specification of Letters Patent.  Patented July 3, 1917.

Application filed June 13, 1913.  Serial No. 773,387.

*To all whom it may concern:*

Be it known that I, JOHN M. CARSON, a citizen of the United States, residing at Los Angeles, in the county of Los Angeles and State of California, have invented certain new and useful Improvements in Automatic Signals, of which the following is a specification.

This invention relates to improvements in automatic signals and particularly to that type of signals that is adapted for attracting attention and giving warning of danger at various places, such for instance as railway crossings.

It is an object of the invention to provide a signal device with a movable arm carrying a target, lamp or other signal device, and to provide means adjacent to the said arm that is capable of moving the arm first to one side and then to the other to swing the signal device back and forth.

It is also an object of the invention to provide a signal device having an oscillating arm carrying a warning signal and to so connect the arm with the core of a double solenoid that the said arm may be oscillated by the actuation and exciting of one winding and then the other of the solenoid, means being provided for passing an electric current through said windings alternately, in accordance with the movement of the arm.

In the accompanying drawing forming a part of this specification:

Figure 1 is a side elevation of the signal device constructed in accordance with the present invention.

Fig. 2 is a side elevation of a similar mechanism but showing electro-magnets for actuating it of a different type from those shown in Fig. 1.

The signal mechanism of the present invention is especially adapted for attracting the attention of the public by means of a moving target, sign, light or other device, to the likelihood of danger as at railway crossings or other places where the public must pass. In the accompanying drawing in which the preferred forms of the mechanism have been shown, 1 indicates a signal arm, which is usually provided with a target or disk 2 carrying any desired warning sign and which usually also has a centrally arranged lamp 3, preferably of the electric type for giving warnings at night. The lower end of the arm 1 is pivotally mounted upon bearings at 4. The arm is free to oscillate or rock back or forth upon these bearings. Movably mounted upon the arm 1 is a bearing casing 5, preferably surrounding the said arm and having antifriction bearings interposed between it and the said arm. As shown in Fig. 1 said bearings are usually in the form of antifriction rollers 6 arranged in the said casing 5 on each side of the arm 1 and so as to engage the same. The bearing casing or box 5 may thus be caused to move the arm 1 and at the same time slip longitudinally thereon. Projecting from the casing 5 is a stud 7 which engages a bearing 8 formed at the center of a core 9. The core 9 projects equal distances upon each side of the bearing 8 and its ends extend into the hollow solenoid coils 10 arranged on opposite sides of the arm 1 as clearly shown in Fig. 1. Brackets 11 rising from a suitable base are provided for supporting the said solenoid coils 10.

A circuit changing device is also employed in connection with the oscillating arm 1 and such device is usually made in the form of an oscillating sector 12 which is pivotally mounted oppositely the pivot bearing of the arm 1, its movement being about the same axis. The outer corners of the sector 12 are provided with contact projections 13 and 14 adapted to engage and electrically connect oppositely arranged contacts 15 and 16 and 17 and 18. Circuits may thus be completed through a suitable source of electrical energy and the coils 10 for operating the core 9 and causing its reciprocation in oscillating the signal arm. As shown in the drawing a conductor 19 leads from the contact 15 to one end of the winding of the opposite solenoid coil 10. A conductor 20 leads from the other end of this winding to a source of electrical energy as a battery 21. The current may pass from the battery 21 by conductor 22 to a switch 23 and the contact 16 is connected by a conductor 24 with said switch 23. Thus when the contact piece 13 rests against and connects the contacts 15 and 16, a circuit will be established through the solenoid 10 on the opposite arm 1 from said contacts so as to attract the core 9 into the coil thus energized and correspondingly move the signal arm.

The contacts 17 and 18 are connected in a similar way with the other solenoid coil. Thus a conductor 25 connects the contact 17 with the solenoid coil 10 on the opposite side of the device, and conductor 26 connects the said coil with the switch 23. A conductor 27 also connects the conductor 20 with the contact 18. By this means a circuit can be passed through the contacts 17 and 18 and the battery for energizing the solenoid coil upon the opposite side of the machine for moving the arm in the direction indicated by the arrow in Fig. 1. It will be understood that the operation of the signal may be started or stopped by the closing or opening of the switch 23 and that the said switch may be manually or automatically operated as preferred and in conjunction with other mechanisms if desired, within the scope of the invention. It will also be understood that as long as the switch is closed, an actuating current will flow through first one solenoid coil and then the other for oscillating the arm 1, the sector 12 being automatically operated by the arm 1 striking the contacts 13 and 14 in alternation, for changing the circuits. The said sector is usually located close to the arm and upon one side thereof and the contact pieces 13 and 14 project laterally therefrom into the path of the said arm for accomplishing the circuit changing operation just described. The arm 1 may be hollow and conductors 28 and 29 be passed therethrough to supply the lamp 3 with an electric current when it is to be lighted. The said conductors 28 and 29 are connected with any desired lighting circuit not shown.

The means for oscillating the arm 1 may be varied within the spirit of the invention. Thus as shown in modified form illustrated in Fig. 2 the signal arm 1 may be provided with a bar or piece 30 secured thereto a short distance from the pivotal bearing of said arm, the ends of said bar 30 being arranged opposite the poles 31 and 32 of electro-magnets 33 and 34. The said electro-magnets are supported by brackets 35 and 36 mounted upon the base of the device. The other portions of the mechanism are like the parts already described in Fig. 1 and the electrical connections are the same, the arrangement being such that when a current is established through the electro-magnet 33 the signal arm will be pulled in one direction and upon reaching the limit of its movement in that direction will cause the deënergizing of the magnet 33 and the energizing of magnet 34 for moving the arm in the other direction. The action is thus the same as when the double solenoid as shown in Fig. 1, is employed.

It will be observed that in form of the device shown the circuits will not be established through both the solenoid coils or both the electro-magnets at the same time but that first one and then the other will be energized under the control of the circuit changing device for automatically continuing the oscillation of the arm and signal while switch 23 is closed.

What is claimed is:

1. A signal device comprising a swinging arm, a swinging contact member moving about same center as the said arm, circuits including magnets adapted to be energized alternately for drawing the said arm one way or the other, pairs of contacts one of each pair being connected with a source of electrical energy, and one of each pair with one of the magnets, the movable contact member being carried by the said swinging arm against the said pairs of contacts, alternately for bridging those which will complete a circuit through a magnet, first on one side of the arm and then on the other side.

2. A signal mechanism comprising a swinging signal arm, a signal carried thereby and a pivoted contact making member having projections extending into the path of the said swinging member, contact pieces adapted to be bridged and connected by the said projections, and circuits including magnets, said circuits being adapted to be closed by the connecting of said contacts for moving the said swinging arm.

3. A signal mechanism comprising a swinging arm carrying signal means, magnets arranged upon each side of said arm and adapted to draw it first in one direction and then in the other, circuits comprising separated contact points upon one side of the arm, separated contact points upon the other side of said arm, a movable contact member having contact making projections adapted to be struck by the swinging arm and moved to rest upon and bridge the space between each set of contact points, whereby the circuits through the magnets will be complete alternately for pulling the said arm first in one direction and then in the other.

4. A signal mechanism comprising an oscillating signal carrying arm, a signal thereon, magnets opposing each other, circuits therefor, a core bar having its ends extending into the said magnets, the said bar being centrally pivoted upon the oscillating arm, a group of contacts adapted to complete a circuit through one of the magnets, a group of contacts adapted to close a circuit through the other magnet, a pivoted member adapted to rock between the opposite groups of contacts and having contact making projections extending into the path of the oscillating arm, and adapted to connect the contacts of each group when they are carried against the said contacts by the movement of the oscillating arm whereby the magnets will be energized alternately for producing the oscillation of the signal arm.

In testimony whereof, I have hereunto set my hand, in presence of two witnesses.

JOHN M. CARSON.

Witnesses:
 LILLIE VOLLMER,
 CASSELL SEVERANCE.